Patented Jan. 6, 1931

1,787,676

UNITED STATES PATENT OFFICE

ALFRED GRESSLY, OF FRANKFORT-ON-THE-MAIN-MAINKUR, GERMANY, ASSIGNOR TO GENERAL ANILINE WORKS, INC., OF NEW YORK, N. Y., A CORPORATION OF DELAWARE

MANUFACTURE OF NEW DISAZODYESTUFFS

No Drawing. Application filed June 13, 1928, Serial No. 285,223, and in Germany June 17, 1927.

I have found that new and valuable disazodyestuffs are obtained by combining an aryl amide of 2,3-hydroxynaphthoic acid of the general formula:

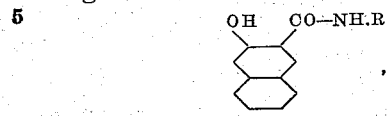

wherein R means an arylresidue which may be substituted, with a diazotized aminoazocompound of the general formula:

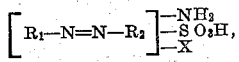

wherein $R_1$ and $R_2$ mean aryl residues which may be substituted by monovalent groups and X means a sulfonic or a carboxylic acid group. The new dyestuffs correspond to the general formula:

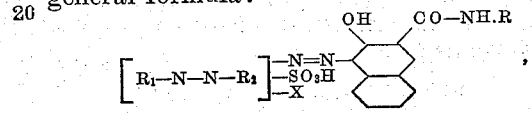

wherein R, $R_1$, $R_2$ and X have the aforesaid signification. They dye wool blue to bluish black shades of a good fastness to washing, hot-pressing and light. The dyeings may be afterchromed, if the dyestuffs applied contain the well known groups suitable for this aftertreatment.

In order to further illustrate my invention the following examples are given, the parts being by weight and all temperatures in centigrade degrees, but it is understood, that my invention is not limited to the particular products or reacting conditions mentioned therein.

Example 1

The diazocompound of 22.3 parts of 1-aminonaphthalene 4-sulfonic acid is coupled in the usual manner with 24.5 parts of the sodium salt of 1-amino-naphthalene-7-sulfonic acid and the formed amino-azo-compound is dissolved in the form of its di-sodium salt in about 1000 parts of water. The solution is acidified with 45 parts of hydrochloric acid of 19° Bé. and diazotized at about 5° with 6.9 parts of sodium nitrite. Then the diazo solution is allowed to run while stirring into an aqueous solution of 29.3 parts of 2-hydroxy-naphthalene-3-carboxylic acid p-anisidide, 24 parts of caustic soda solution of 40° Bé. and 20 parts of soda, warmed at 20–25°. After some hours the coupling is finished. Then the mass is warmed at 60–70°, the dyestuff is precipitated by addition of common salt and isolated in the usual manner.

It corresponds probably to the formula:

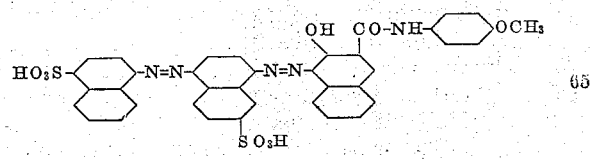

It represents when dry a black powder, soluble in warm water with a violet tint, which turns blue in the hot by the addition of a dilute caustic soda solution and becomes again violet in the cold. It dissolves in concentrated sulfuric acid with a dirty green tint which solution turns when diluted with water at first blue, then violet black while separating the dyestuff. It produces on wool from an acid bath bluish black dyeings of a good fastness. When starting instead from 1-amino-naphthalene-7-sulfonic acid from the technical mixture of the 1-amino-naphthalene-6-sulfonic acid and 7-sulfonic acid, a dyestuff of analogous properties is obtained.

Example 2

30.3 parts of 1-amino-naphthaline-3-6-disulfonic acid are diazotized and coupled in the known manner with 14.3 parts of α-naphthylamine. The amino-azo-compound thus formed is dissolved in the form of its disodium salt in about 1000 parts of water, the solution is acidified with 45 parts of hydrochloric acid of 19° Bé. and diazotized at 0–5° with 6.9 parts of sodium nitrite. Then the diazo mass is allowed to run at 20–25° into an alkaline aqueous solution containing 26.3 parts of 2-hydroxy-naphthalene-3-carboxylic acid anilide, 24 parts of a caustic soda solution of 40° Bé. and 20 parts of soda. After some hours the mixture is warmed at 60–70° and the dyestuff is precepitated by addition of common salt. It corresponds to the formula:

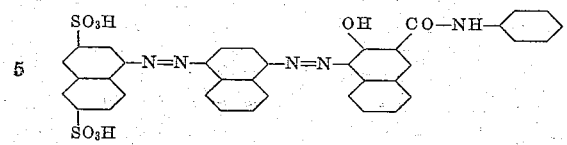

It is soluble in warm water with a violet blue tint turning violet by addition of a caustic soda solution and cooling down. It dissolves in concentrated sulfuric acid with a blue tint turning at first dirty blue when diluted with water, then violet while separating the dyestuff. It dyes wool from an acid bath bluish black shades of a good fastness.

When the 1-amino-naphthalene-3-6-disulfonic acid is replaced by the 1-amino-naphthalene-3-7-disulfonic acid or by the technical mixture of the two acids, a dyestuff of nearly the same properties is obtained. More violet dyeing products are obtained when naphthylamine is replaced by cresidine or p-xylidine.

*Example 3*

15.3 parts of p-amino-salicylic acid are diazotized and coupled in the known manner with 24.5 parts of the sodium salt of 1-amino-naphthalene-7-sulfonic acid. The mono-azo-compound thus formed is dissolved by addition of 13.5 parts of caustic soda solution 40° Bé. and mixed with 8.6 parts of sodium nitrite. This solution is allowed to run while well stirring into a mixture of 48.5 parts of hydrochloric acid ($d=1.15$) and ice water the temperature not exceeding 5°. The diazo-compound separates as a brown precipitate. To this suspension a solution of 40 parts of calcinated soda in about 300 parts of water and then a solution of 26.3 parts of 2-hydroxy-naphthalene-3-carboxylic acid anilide in 22.7 parts of caustic soda solution 40° Bé. and about 400 parts of water is added. The temperature is maintained during the coupling at about 10° by means of ice. After 3-4 hours stirring the dyestuff is warmed at 50-60°, precipitated by addition of a common salt solution, filtered off and washed with dilute salt water.

The new dyestuff corresponds to the formula:

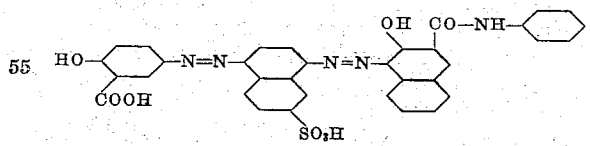

It represents when dry a black powder soluble in water with a violet blue tint turning blue by addition of caustic soda solution. It dissolves in concentrated sulfuric acid with a green tint. It dyes wool from an acetic acid bath blue shades or a good fastness being darkened when aftertreated with a chromate.

Chromable dyestuffs of similar properties are obtained when ortho-hydroxy-arylamines, for instance nitro-ortho-aminophenols or ortho-amino-phenol-sulfonic acids, are employed instead of para-amino-salicylic acid.

When the anilide of the 2-hydroxynaphthalene-3-carboxylic acid is replaced by the equivalent amount of another arylamide for instance para-anisidide, meta-nitro-anilide, α-naphthylamide or other analogous derivatives of this acid the shades of the afterchromed dyeings are more or less deepened, respectively turned to bluish black, the fastness remaining unchanged.

I claim:

1. A process which comprises combining an arylamide of 2,3-hydroxy-naphthoic acid of the general formula:

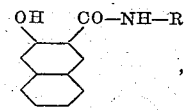

wherein R means aryl which may be substituted, with a diazotized amino-azo-compound of the general formula:

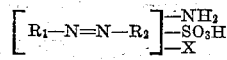

wherein $R_1$ and $R_2$ mean aryl residues which may be substituted by monovalent groups and X means a sulfonic or a carboxylic acid group.

2. A process which comprises combining an arylamide of 2,3-hydroxynaphthoic acid with a diazotized amino-azo-compound of the formula:

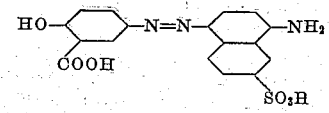

3. As new products the disazodyestuffs of the general formula:

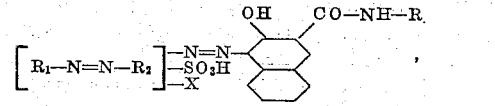

wherein R, $R_1$ and $R_2$ means aryl-residues which may be substituted by monovalent groups and X means a sulfonic or a carboxylic acid group, which products are when dry black powders soluble in water with violet tints, dyeing wool from an acid bath blue to black shades.

4. As a new product the disazodyestuff of the formula:

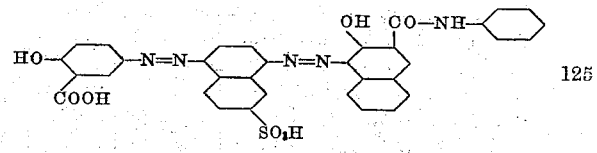

which product represents when dry a black powder soluble in water with a violet blue tint turning blue by addition of caustic soda solution, dissolves in concentrated sulfuric acid with a green tint and dyes wool from an acetic acid bath blue shades of a good fastness being darkened when after treated with a chromate.

In testimony whereof, I affix my signature.

ALFRED GRESSLY.